United States Patent [19]

Grasso et al.

[11] Patent Number: 5,161,050
[45] Date of Patent: Nov. 3, 1992

[54] OPTICAL AMPLIFIER WITH BENT, SINGLE-MODE ACTIVE FIBER

[75] Inventors: Giorgio Grasso, Monza; Aldo Righetti, Milan, both of Italy

[73] Assignee: Pirelli Cavi S.p.A., Milan, Italy

[21] Appl. No.: 642,221

[22] Filed: Jan. 16, 1991

Related U.S. Application Data

[63] Continuation-in-part of Ser. No. 602,364, Oct. 22, 1990, and a continuation-in-part of Ser. No. 651,472, Feb. 6, 1991.

[30] Foreign Application Priority Data

Feb. 12, 1990 [IT] Italy .................. 19341 A/90

[51] Int. Cl.⁵ .................. H01S 3/30; G02B 6/10
[52] U.S. Cl. .................. 359/341; 359/345; 372/6
[58] Field of Search .............. 330/4.3; 372/6; 350/96.131, 96.15, 96.29; 359/341, 345; 385/1

[56] References Cited

U.S. PATENT DOCUMENTS

| | | | |
|---|---|---|---|
| 3,964,131 | 10/1990 | Liu et al. | 372/6 |
| 4,556,279 | 12/1985 | Shaw et al. | 350/96.15 |
| 4,712,075 | 12/1987 | Snitzer | 330/4.3 |
| 4,815,079 | 3/1989 | Switzer et al. | 372/6 |
| 4,815,804 | 3/1989 | Desurvire et al. | 350/96.15 |
| 4,895,421 | 1/1990 | Kim et al. | 350/96.15 |
| 4,906,949 | 3/1990 | Pocholle et al. | 330/4.3 |
| 4,915,468 | 4/1990 | Kim et al. | 350/96.15 |
| 4,923,279 | 5/1990 | Ainslie et al. | 350/96.30 |

FOREIGN PATENT DOCUMENTS 4926977 1/1981 Fed. Rep. of Germany .

*Primary Examiner*—Nelson Moskowitz
*Attorney, Agent, or Firm*—Brooks Haidt Haffner & Delahunty

[57] ABSTRACT

An optical amplifier, particularly useful for optical fiber telecommunication lines, which includes an active fiber doped with a fluorescent dopant which provides light energy emission at the wavelength of the transmission signals when the latter signals are applied thereto. One section of telecommunication line is connected to one input of a dichroic coupler, the output of which is connected to one end of the active fiber and the other input of which is connected to a source of pumping energy at a wavelength lower than that of the transmission signals. The other end of the active fiber is connected to another section of the telecommunication line. In rectilinear form, the active fiber provides single-mode propagation of the energy at the signal wavelength and multi-mode propagation of energy at the pumping energy wavelength. However, the active fiber is bent to a radius of curvature for at least 70% of its length which will provide only fundamental mode propagation at the pumping energy wavelength which also reduces the mode diameter for the transmission signals.

21 Claims, 2 Drawing Sheets

OPTICAL AMPLIFIER WITH BENT, SINGLE-MODE ACTIVE FIBER

RELATED APPLICATIONS

This application is a continuation-in-part of applications Ser. Nos. 07/602,364 filed Oct. 22, 1990 and entitled Amplifier for Optical Fiber Telecommunication Lines and Optical Fiber Telecommunication Lines Incorporating Said Amplifier, and Ser. No. 651,472, filed Feb. 6, 1991, and entitled Double-Core, Active Fiber Optical Amplifier Having a Wide-Band Signal Wavelength, respectively, and is related to application Ser. No. 07/605,693, filed Oct. 30, 1990 and entitled Active-Fiber Optical Amplifier and Ytterbium Doped Fiber Therefor.

FIELD OF THE INVENTION

The present invention relates to an optical amplifier, particularly for telecommunication lines, using an active fiber which is a single mode fiber at the transmission wavelength only.

BACKGROUND OF THE INVENTION

It is known that optical fibers having a doped core obtained by the use of particular substances, such as rare earth ions, have stimulated emission features adapted for use as laser sources and optical amplifiers.

In fact, these fibers can be supplied with a light source of a particular wavelength, referred to as pumping wavelength, which is capable of bringing the dopant atoms to an excited energy state, or pumping band, from which the atoms spontaneously decay within a very short period of time into a laser emission state, in which state they remain for a relatively long period of time.

When a fiber having a high number of atoms at the excited state in the laser emission level is transited by a light signal having a wavelength corresponding to that laser emission state, the signal causes the transition of the excited atoms to a lower level producing light emission having the same wavelength as the signals. Therefore, a fiber of the such kind can be used to achieve an amplification of the signal and in particular, for example, to achieve optical line amplifiers adapted to bring an attenuated transmission optical signal back to a high level after a long travel through a fiber in a telecommunication line.

Optical amplifiers of the such kind are, for example, known from the U.S. Pat. Application Ser. No. 602,364 filed Oct. 22, 1990 and assigned to the assignee of this application, in which the active fiber is of the single-mode type both at the transmission wavelength and at the pumping wavelength.

However, such fibers, which are single-mode both at the transmission wavelength and pumping wavelength, have a different distribution of the luminous power in the fiber section, and in particular, the luminous power of the transmission signal is distributed over an area of the fiber section which is greater than the area in which the pumping power is present.

The fluorescent dopant, responsible for the transmission signal amplification, is concentrated in the fiber core and the fiber in known amplifiers is designed so that the pumping power is also confined in said area and, so that it can be entirely used to excite the fluorescent dopant in the laser emission level. However, since part of the transmission signal power is transmitted to the fiber outside the area in which the fluorescent dopant and pumping power are present, the result is that only part of said signal is available in the fiber area in which it can be amplified.

The above phenomenon brings about a limitation in the amplification efficiency of the amplifier by which is meant the gain of the transmission signal per pumping power unit.

Consequently, the problem arises of increasing said efficiency with respect to known amplifiers.

BRIEF SUMMARY OF THE INVENTION

The present invention has, as one object, the provision of an amplifier in which the transmission signal power and the pumping power have a substantially similar distribution in the active fiber section and are also concentrated in the fiber area in which the fluorescent dopant is present.

It is a further object of the present invention to provide an optical amplifier, in particular, for optical fiber telecommunication lines, which is insertable in series in the optical fiber of a line and which comprises at least a pumping light source, a dichroic coupler having two inputs connected respectively to the optical line fiber carrying a transmission signal and to the pumping light source and an output connected to one end of an active fiber containing a fluorescent dopant in the optical core which provides emission in the wavelength range of the transmission signal and which is to be pumped at the wavelength of the pumping source. The active optical fiber is a fiber which, in a substantially rectilinear configuration, provides single-mode propagation at the transmission signal wavelength and multi-mode propagation at the pumping wavelength, and the active fiber is disposed in a curved configuration over at least 70% of its overall length and with a bending radius corresponding to the propagation in the fiber of only the fundamental mode at the pumping wavelength.

The bending radius of the curved active fiber is in the range of 20 to 140 mm, and preferably, the bending radius of the active fiber is between 35 and 100 mm.

In a preferred embodiment, the transmission signal wavelength is between 1520 and 1570 nm, the pumping wavelength is 980 nm ($\pm 10$ nm) and the fluorescent dopant in the active fiber is erbium.

In particular, the active fiber has at least a curved portion having a bending radius corresponding to the propagation in the fiber itself of only the fundamental mode at the pumping wavelength, which portion is contiguous to non-curved fiber portions, and the length of the curved portion or the sum of the curved portion lengths is greater than 70% of the overall length of the active fiber.

Preferably, the active fiber has a single continuous curved portion with a bending radius corresponding to the propagation in the fiber itself of only the fundamental mode at the pumping wavelength and has portions of non-curved fiber at either or both ends of the active fiber.

In a particular preferred embodiment of an optical amplifier in accordance with the invention, the active fiber is curved with a bending radius corresponding to the propagation in the fiber itself of only the fundamental mode at the pumping wavelength over the whole length thereof except for the substantially non-curved end portions, each having a length less than 400 mm. Preferably, the length of the substantially non-curved end portions is lower than 200 mm.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

Figure 1:
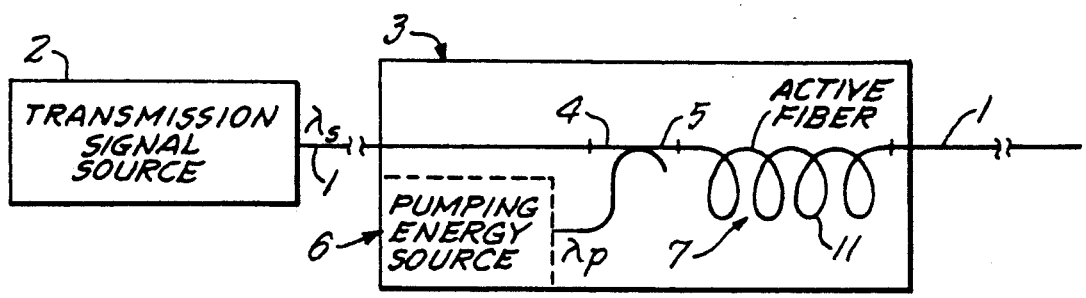
FIG. 1 is a schematic diagram illustrating an optical amplifier using an active fiber.

For the purpose of amplifying signals in optical telecommunication fibers, amplifiers employing optical fibers can be conveniently used. The structure of such an amplifier is diagrammatically shown in FIG. 1, in which the numeral 1 denotes an optical telecommunication fiber to which a transmission signal of a wavelength $\lambda_s$, generated by a signal laser emitter 2 is supplied. The signal, being attenuated after a certain line length, is supplied to an optical amplifier 3, substantially consisting of a dichroic coupler 4 by which it is joined, on a single outgoing fiber 5 with a pumping signal of wavelength $\lambda_p$, generated by a pumping laser emitter 6. An active fiber 7 connected to the fiber 5 at the output of the coupler constitutes the signal amplifying element, and the amplified transmission signal is then introduced into the line fiber 1 and is transmitted towards its destination.

The active fiber 7 for the amplification of the transmission light signal is a silica-based optical fiber which is doped with a fluorescent material adapted to generate a light emission which is stimulated in the presence of the transmission light signal which is amplified thereby.

As the fluorescent material, it is convenient to use $Er_2O_3$ which can have stimulated transitions, also referred to as "laser" transitions, at wavelengths which are convenient for the remote transmission of telecommunication signals.

Figure 2:
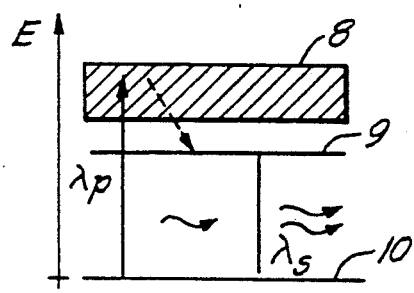
FIG. 2 is a diagram illustrating the energy transitions of a fiber of the type to be used for an amplifier according to the diagram of FIG. 1 which transitions are adapted to generate a stimulated (laser) emission.

As shown in the diagram of FIG. 2, which relates to a fiber of the above type and which symbolically illustrates the available energy states for a solution of erbium ions in the silica-based fiber matrix, the introduction of a light power into the active fiber at the "pumping" wavelength $\lambda_p$, lower than the wavelength $\lambda_s$ of the transmission signal, brings a certain number of $Er^{3+}$ ions present as the dopant in the fiber glass-based matrix, to an "excited" energy state 8, referred to as the "pumping" band, from which state ions spontaneously decay into an energy level 9 constituting a laser emission level.

It is known that, while the transition from band 8 to level 9 is associated with a thermal-type emission, which is dispersed outside the fiber (phonon radiation), the transition from level 9 to the base level 10 generates a light emission of a wavelength corresponding to the energy value of the laser emission level 9. If a fiber containing a high amount of ions at the laser emission level is transited by a signal of a wavelength corresponding to such an emission level, the signal causes the stimulated transition of the ions from the emission state to the base state, before the spontaneous decay thereof, with a cascade phenomenon producing the emission of a greatly amplified transmission signal at the outlet of the active fiber.

Figure 4:
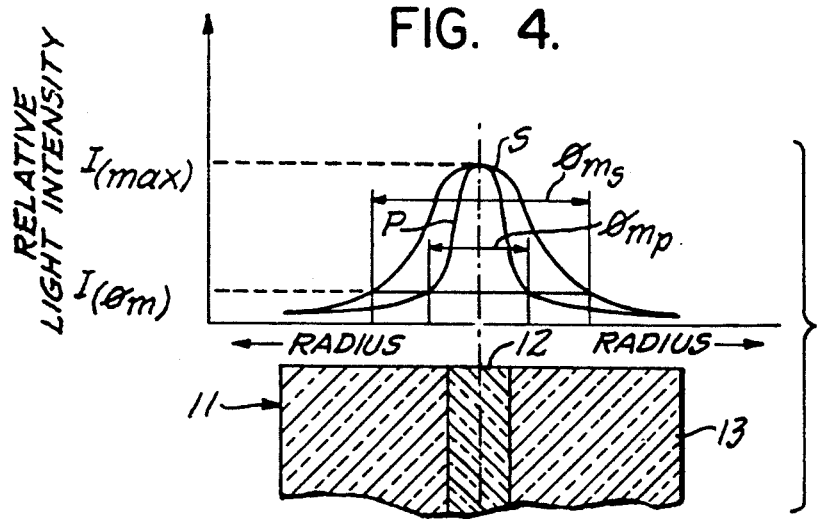
FIG. 4 is a diagram showing the radial distribution of the light intensity in an optical fiber.

Diagrammatically shown in FIG. 4 is the end of a fiber seen in axial section and denoted by the numeral 11. A core 12 and a cladding 13 are illustrated for such a fiber, and they have different refractive indices.

For use as the active fiber in an amplifier, the dopant, that is, $Er^{3+}$, is present within the core 12.

In order to achieve a high amplification gain, it is desirable that the active fiber 7 in the amplifier be of the single-mode type both at the transmission wavelength and the pumping wavelength, as disclosed in said U.S. application Ser. No. 602,364.

Figure 3:
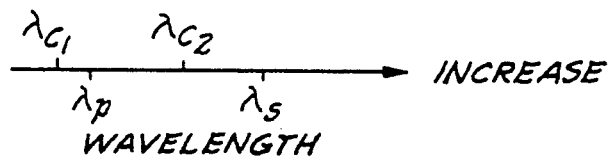
FIG. 3 is a diagram showing the relationship between the pumping, transmission and cut-off wavelengths.

As shown in FIG. 3, based on the teachings contained in said application, the active fiber is of such a size that the fiber cut-off wavelength $\lambda_{cl}$, also referred to as "$\lambda_{cut-off}$", above which the propagation of the fundamental mode alone occurs in the fiber, is both lower than the wavelength of the transmission signal $\lambda_s$, and lower than the wavelength of the pumping radiation $\lambda_p$.

The important factors for the purpose of selecting the cut-off wavelength of the fiber are substantially the numeral aperture NA and the core diameter thereof.

The numeral aperture NA of a fiber having a refractive index profile substantially of the "step index" type or the like is defined as:

$$NA = (n^2_1 - n^2_2)^{\frac{1}{2}}$$

where $n_1$ is the refractive index of the fiber core and $n_2$ is the refractive index of the fiber cladding.

It is known that the desired refractive indices of the fiber core and cladding can be achieved by selecting the concentration in the core and cladding themselves of the primary dopant, or index varying dopant, introduced into the preform from which the fiber is obtained through well-known techniques.

The dopants used for the purpose usually consist of $GeO_2$ or $Al_2O_3$.

Within the fiber, a light radiation having a wavelength for which there is a single-mode propagation in the fiber, that is higher than the fiber cut-off wavelength, exhibits a radial distribution of the light intensity of the type shown in FIG. 4 by curves P and S the development of which is substantially of the Gaussian type, with a maximum intensity $I_{max}$ along the fiber axis and decreasing in value substantially to zero towards the fiber periphery.

Based on such distribution, a mode diameter $\phi_m$ is defined as the diameter at which there is a light intensity $I(\phi_m)$ in the fiber:

$$I(\phi_m) = \frac{1}{e^2} I_{max}.$$

where $I_{max}$ is the maximum light intensity in the fiber, based on the CCITT G.652 specification.

As is apparent from FIG. 4, most of the transmitted light power S is substantially confined within the mode diameter $\phi_{m\,s}$.

For the purpose of an efficient amplification, it is of great importance to have a high density of the pumping power in the fiber core 12, where the fluorescent dopant is present, so that a high population inversion in the dopant can be kept, that is, a high percentage of dopant atoms available for amplification at the higher laser level 9, as compared with those at the base state 10. The pumping power transmitted outside the core, where no dopant is present, is substantially inactive for the purpose of the dopant inversion at the higher laser level.

The transmission signal, in turn, should have a radial distribution intensity in the fiber similar to that of the pumping signal, for the purpose of being transmitted to the fiber region in which most of the luminous pumping power is present, so that it can be efficiently amplified.

To this end, therefore, the mode diameters of the pumping signal and transmission signal should be as similar as possible.

In an optical fiber of the type having the core 12 and cladding 13, which is shown in FIG. 4 in alignment with the curves of the radial light intensity distribution of pumping and transmission signals, the mode diameter $\phi_{ms}$ at the transmission wavelength $\lambda_s$, the curve of the radial light intensity distribution of which is represented by curve S in the drawing, is substantially greater than the mode diameter $\phi_{mp}$ at the pumping wavelength $\lambda_p$ which has the intensity curve P. The latter mode diameter substantially corresponds to the core 12 diameter. This means that a significant part of the light signal does not propagate into the area of the active fiber to which the pumping energy is supplied and in which the dopant is present.

Figure 7:
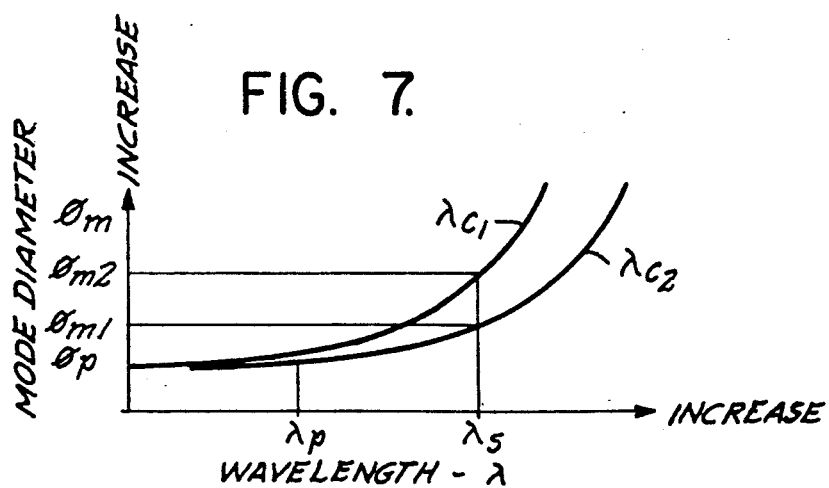
FIG. 7 is a graph showing the variations in the mode diameter in a fiber, depending upon the wavelength.

In fact, it is to be noted that the mode diameter for wavelength values close to the cut-off wavelength $\lambda_c$ of the fiber is substantially constant and not very different from the core diameter of the fiber itself, and for greater wavelengths greatly increases as shown in FIG. 7. Therefore, in order to ensure that the fiber be single-mode at the pumping wavelength $\lambda_p$ at 980 nm ($\pm 10\%$), for example, in the case of amplifiers having an erbium-doped active fiber, a fiber having a cut-off wavelength $\lambda_c$ lower than 980 nm must be used and as a result, there is a very high mode diameter at the transmission wavelength $\lambda_s$ which is much greater than the mode diameter at the pumping wavelength $\lambda_p$ so that most of the transmission signal does not propagate into the fiber area in which it can be amplified.

The above behavior occurs when the active fiber has a rectilinear or substantially rectilinear configuration, the term "substantially rectilinear configuration" meaning that the fiber is not submitted to geometrical deformations capable of greatly modifying the optical behavior thereof. For such reason, in accordance with the specification of the Consultive Committee International Telegram & Telephone (CCITT), Instruction G.652) there is provision for evaluating the theoretical cut-off wavelength based on the profile of the refractive index in the fiber, and the cut-off wavelengths in operating conditions.

In particular, said specification takes into account the possibility of measuring a cut-off wavelength for a curved fiber, the measurement being carried out on a single fiber ring of a radius of 140 mm. The detected variation in the cut-off wavelength under these conditions, as compared with the theoretical value is, on the other hand, rather small, a difference lower than about 5% with respect to the theoretical cut-off wavelength being expected.

In accordance with the present invention, the active fiber of the amplifier is selected to be of the single-mode type only at the transmission wavelength $\lambda_s$, that is, having a value of cut-off wavelength $\lambda_{c2}$ lower than $\lambda_s$, but substantially higher than $\lambda_p$, as shown in FIG. 3.

With said fiber, the mode diameter at the transmission wavelength, particularly in the range between 1520 and 1570 nm, which is adapted for the use of amplifiers having an erbium-doped active fiber and which is close to the cut-off wavelength, appears to be sufficiently small and close to the diameter of the fiber core. The fundamental mode of the pumping signal, in turn, has a diameter close to that of the fiber core, and therefore, the transmission signal power is substantially confined within the fiber area in which the pumping signal and active dopant are present.

Figure 5:
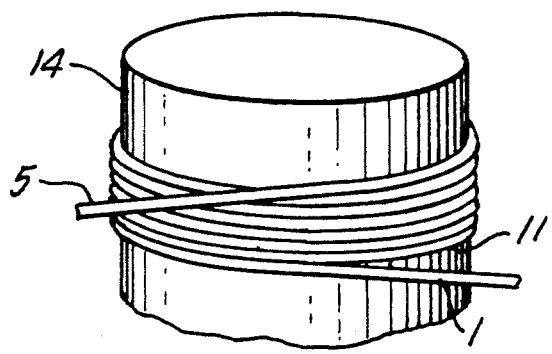
FIG. 5 is a schematic diagram of an active fiber arrangement in an amplifier in accordance with the invention.
Figure 6:
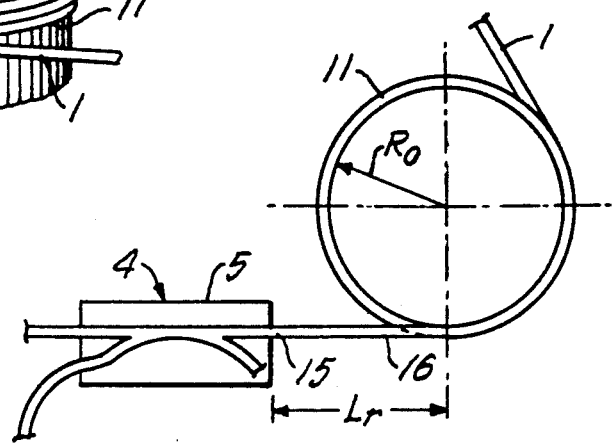
FIG. 6 is a top view of the embodiment shown in FIG. 5 with an optical coupler connected thereto.

The active fiber is disposed in a curved configuration over substantially the whole length thereof, preferably in the form of circular turns constituting the amplifier as shown in FIGS. 5 and 6, but the active fiber may have other configurations, e.g. sinusoidal. For example, the active fiber 11 is wound around a cylindrical support or the like, and the fiber bending is selected in accordance with the present invention with a radius $R_c$ substantially lower than 140 mm, so as to permit the propagation of the fundamental mode alone within the fiber even for wavelengths lower than the above-mentioned wavelength $\lambda_{c2}$ and in particular, even for the pumping wavelength $\lambda_p$.

In fact, the fiber bending causes the fiber to transmit the fundamental mode alone for wavelengths which are increasingly smaller as the bending imparted to the fiber becomes sharper, that is, as $R_c$ becomes smaller. Therefore, it is possible to define a bending radius $R_p$ at which, for a given wavelength and in particular, for the pumping wavelength, only propagation of the fundamental mode within the fiber is possible.

Therefore, the bending radius $R_c$ adopted for the active fiber is lower than, or equal to, the radius $R_p$. Practically, since the bending can cause a mechanical weakening of the fiber structure, making it liable to breakage or cracking, preferably, a bending radius equal to $R_p$ or close thereto is used.

The choice of an appropriate value for said bending enables modes higher than the pumping wavelength to be eliminated from the active fiber so that within the fiber, the fundamental mode of the pumping signal alone is driven while keeping a cut-off wavelength giving rise to a small mode diameter in the fiber at the transmission signal wavelength.

Figure 8:
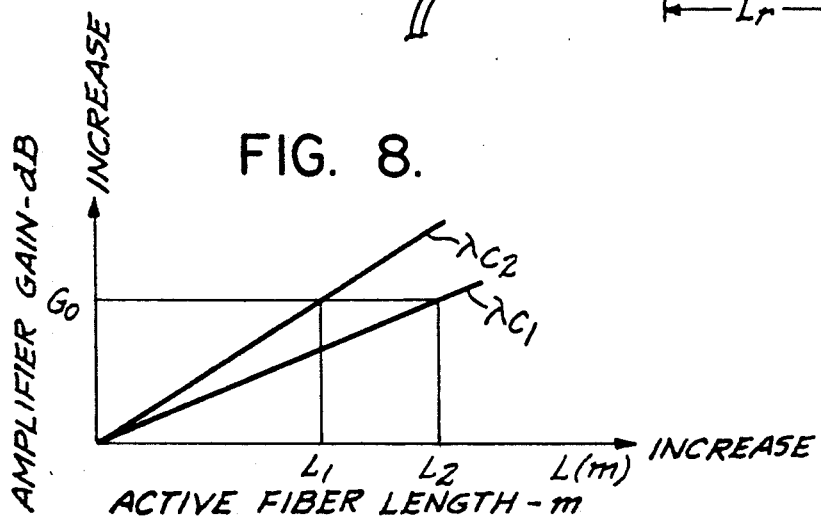
FIG. 8 is a graph showing the gain in an optical amplifier depending upon the length of the active fiber used.

In this manner, it is possible to achieve a particularly high amplification efficiency, that is, a high amplification gain per unit of supplied pumping power, so that a fiber of shorter length can be used to achieve the desired amplification. As shown in FIG. 8, a gain $G_O$ can be reached with an active fiber of length $L_1$, using a fiber of a cut-off length $\lambda_{c2}$ greater than 980 nm, which is much lower than the length $L_2$ necessary to achieve the same gain with a fiber having a cut-off wavelength $\lambda_{c1}$ less than 980 nm.

In the dichroic coupler 4 produced on the basis of the teachings disclosed in the above-mentioned U.S. Pat. application Ser. No. 602,364, the fiber 5 which carries the transmission signals joined with the pumping signal is of the single-mode type at both wavelengths. Therefore, this fiber has a mode diameter at the transmission wavelength $\lambda_s$ larger than the mode diameter in the active fiber in accordance with the invention. The weld which connects the fibers 5 and 11 exhibits an attenuation at the transmission wavelength due to such a diameter difference.

A further light attenuation occurs in the welding between the active fiber 11 and the line fiber 1. In fact, although the commercially available fibers used as line fibers are of the single-mode type at the transmission wavelength alone, in said range between 1520 and 1570 nm, they have a rather high mode diameter, for the purpose of achieving easy joining and the like, equal to or greater than the mode diameter of the coupling fiber 5.

The overall gain $G_{ex}$ in an amplifier is given by the inner gain of the active fiber $G_{in}$, minus losses or attenuations $A_s$ due to the welds between the different fibers. Therefore, in order to achieve this result, a gain $G_{in} = G_{ex} + A_s$ is required from the active fiber.

The use of a fiber in accordance with the present invention, having a very small mode diameter, introduces greater losses due to welds as compared with known active fibers which are also single-mode at the wavelength $\lambda_p$, but these additional losses generally appear negligible as compared with the obtained efficiency increase.

The minimum bending radius $R_c$ of the active fiber of practical use is higher than about 20 mm, and with a radius smaller than this radius, the mechanical strength of the curved fiber becomes critical. In addition, the weld losses at the junctions become important, due to the great difference between the mode diameters of the active fiber 11 and line fiber 1 or the fiber 5 coming out of the coupler. Bending radii higher than 140 mm are of little utility for achieving an important shifting of the cut-off wavelength, and preferably $R_c$ is greater than 35 mm and more preferably, is in the range of 50 to 100 mm.

In connection with said bending radii, the maximum value of a cut-off wavelength $\lambda_c$ under rectilinear conditions, enabling the single-mode propagation of the pumping signal at 980 nm to be achieved when the fiber is curved to a corresponding bending radius, without reaching critical values of the mechanical strength of the fiber itself is about 1280 nm, corresponding to a mode diameter of about 4 μm. With a bending radius $R_c$ of 50 mm, said cut-of wavelength value is about 1100 nm, the mode diameter being equal to about 5.3 um, whereas the fundamental mode of the pumping signal has a diameter of about 3.8 to 4 μm.

For a single-mode fiber in rectilinear condition at the pumping wavelength, the mode diameter at the wavelength of the transmission signal is higher than 6 μm.

For the best use of the active fiber qualities in the amplifier in accordance with the invention, preferably, it is the entire length of the active fiber which should be curved to the selected bending radius, that is, the active fiber must be disposed in a curved configuration, for example, wound to form turns on the support, as diagrammatically shown in FIG. 5, immediately downstream of the joining of the fiber 11 to the coupling fiber 5 by a weld 15.

Should curving of the entire length of the fiber 11 not be possible or desirable, for example, in order to avoid transmission of the bending stresses caused by the curved configuration of the active fiber to the welding 15, which usually constitutes a mechanically weak point in the fiber, it is possible, as shown in FIG. 6, to accept a non-curved or only slightly curved, portion 16 of active fiber. Such expedient does not involve a substantial reduction in the advantages given by the active fiber bending.

Preferably, the length $L_r$ of the rectilinear, or substantially rectilinear, active fiber portion 16, that is, having a bending radius greater than $R_c$ as defined above, immediately downstream of the coupler, is less than 400 mm and preferably $L_r \leq 200$ mm. Such a substantially rectilinear fiber length can also be used at the opposite end of the active fiber 11 where it joins the line fiber 1 without the amplification efficiency being greatly impaired.

In fact, the coupling of the higher modes in the fiber takes place proportionally to the length of travel in the fiber itself, and therefore, after a portion of the stated length, no important pumping power transfer takes place in the active fiber from the fundamental mode to higher modes.

On the other hand, useful results, that is, an increase in the amplification efficiency with respect to amplifiers having an active fiber which is also single mode at the pumping wavelength can be obtained, in accordance with the present invention, with an active fiber which is bent or curved only over a portion of the length thereof should this be needed for meeting requirements of different origin, provided that the portion of bent fiber at the bending radius corresponding to the propagation of the fundamental mode alone of the pumping power, is more than 70% of the overall fiber length.

For construction purposes, in particular for keeping the bulkiness of the amplifier structure within reduced limits, the bent fiber portion constitutes the middle portion of the active fiber, whereas the leading and trailing fiber portions, contiguous to the end welds of the fiber itself, can be rectilinear. However, under some conditions, the active fiber may also have several bent portions alternated with substantially rectilinear portions.

By way of example, a germanium and erbium doped active silica-based fiber 11 having the following characteristics has been prepared:

| | |
|---|---|
| Core diameter | 3.6 μm |
| Numerical aperture $(n_1{}^2 - n_2{}^2)^{\frac{1}{2}}$ | 0.23 |
| $\lambda_c$ (theoretical cut-off wavelength) | 1100 nm |
| Signal mode diameter | 5.3 μm |
| Erbium content (weight of $Er_2O_3$) | 350 ppm |

With the above fiber, an amplifier in accordance with the diagram shown in FIG. 1 has been made, in which the fiber has been bent to form contiguous turns having a bending radius $R = 50$ mm over the whole length thereof; under these conditions a value of the cut-off wavelength has been measured:

$\lambda_c(R)$ (cut-off wavelength on radius R) 980 nm

The amplifier had the following features:

| | |
|---|---|
| Pumping power | 17 mW |
| Length of the active fiber | 8.4 m |

The amplifier was connected to a line fiber 1 having a cut-off wavelength $\lambda_c(F) = 1100$ nm, and having a transmission signal to be amplified in power:
Power of the incoming signal −45 dBm The amplifier's optical coupler had the fiber 5 carrying the transmission signal and pumping signal had a cut-off wavelength of $\lambda_c(A)=980$ nm.

With the described configuration, an amplification gain $G_1$ of 30 dB was achieved.

For comparison, an amplifier having the same structural arrangement has been made, using an active silica-based fiber doped with germanium and erbium having the following features:

| | |
|---|---|
| Core diameter | 3.6 μm |
| Numerical aperture $(n_1^2-n_2^2)^{\frac{1}{2}}$ | 0.21 |
| $\lambda_c$ (theoretical cut-off wavelength) | 980 nm |
| Signal mode diameter | 6.2 μm |
| Erbium content (weight of $Er_2O_3$) | 350 ppm |

The fiber used in the amplifier was substantially rectilinear in the sense previously described, so as to provide a significantly different cut-off wavelength.

The amplifier had the following features:

| | |
|---|---|
| Pumping power | 20 mW |
| Length of the active fiber | 10 m |

The signal to be amplified, carried by an active fiber similar to the one of the preceding example had the following power:
Power of the incoming signal −45 dBm An amplification gain $G_2$ of 30 dB was achieved.

As can be seen, the amplifier in accordance with the invention has been capable of supplying the same amplification gain as the comparative amplifier using a substantially rectilinear fiber, although a portion of the active fiber of shorter length and lower pumping power has been used, thereby providing a significantly greater efficiency.

The support structure for the coiled fiber turns, adapted to keep them at the desired bending radius, can be of any kind having reasonable dimensional stability, e.g. made of metal or polymeric materials, although such structure is dependent upon the structural features of the amplifier envelope, and therefore, such structure is not described in detail.

Although preferred embodiments of the present invention have been described and illustrated, it will be apparent to those skilled in the art that various modifications may be made without departing from the principles of the invention.

We claim:

1. An optical amplifier for the amplification of optical transmission signals at a first predetermined wavelength propagating in an optical fiber line, said amplifier comprising:
    a pumping energy source for providing pumping energy at a second predetermined wavelength shorter than said first predetermined wavelength;
    a dichroic coupler having two inputs and an output, one of said inputs being coupled to said pumping energy source and the other of said inputs being adapted to be connected to said optical fiber line in which said optical transmission signals are propagated;
    an active fiber which is long relative to its width and which contains a fluorescent dopant which can be pumped at said second predetermined wavelength and which emits radiation at said first predetermined wavelength, said fiber, in substantially rectilinear configuration, providing single-mode propagation of signals at said first predetermined wavelengths and multi-mode propagation of energy at said second predetermined wavelength and said fiber being coupled at one end to said output of said dichroic coupler and being bent transversely to its length into a curved configuration for at least 70% of its length with a curvature radius such that said fiber in curved configuration provides substantially only single mode propagation therein at said second predetermined wavelength; and
    said amplifier being without means for feeding radiation energy at said first predetermined wavelength from the other end of said active fiber to said one end of said active fiber.

2. An optical amplifier according to claim 1 wherein said curvature radius is in the range from 20 to 140 mm.

3. An optical amplifier according to claim 1 wherein said curvature radius is in the range from 35 to 100 mm.

4. An optical amplifier according to claim 1 wherein said first predetermined wavelength is in the range from about 1520 nm to about 1570 nm, said second predetermined wavelength is in the range from about 970 nm to about 990 nm and said fluorescent dopant is erbium.

5. An optical amplifier according to claim 1 wherein said configuration and at least another portion of lesser curvature, the sum of the lengths of the portion or portions of said curved configuration being at least equal to 70% of the length of said fiber.

6. An optical amplifier according to claim 5 wherein said another portion is at one end of said one portion.

7. An optical amplifier according to claim 5 wherein there are two of said another portion, and said one portion is continuous, one said another portion is at one end of the last-mentioned said one portion and the other said another portion is at the opposite end of the last-mentioned said one portion.

8. An optical amplifier according to claim 8 wherein the length of each said another portion is less than 400 mm.

9. An optical amplifier according to claim 7 wherein the length of each said another portion is less than 200 mm.

10. An optical amplifier according to claim 1 further comprising an optical fiber which propagates said first predetermined wavelength coupled to said other of said inputs of said dichroic coupler.

11. An optical amplifier according to claim 10 further comprising an optical fiber which propagates said first predetermined wavelength coupled to said other end of said active fiber.

12. An optical fiber signal transmission system comprising:
    a source of optical transmission signals having a first predetermined wavelength;
    an optical amplifier for amplifying said transmission signals, said amplifier comprising:
        a pumping energy source for providing pumping energy at a second predetermined wavelength shorter than said first predetermined wavelength;
        a dichroic coupler having two inputs and an output, one of said inputs being coupled to said pumping energy source; and
        an active fiber which is long relative to its width and which contains a fluorescent dopant which can be pumped at said second predetermined wavelength and which emits radiation at said first predetermined wavelength, said fiber, in substantially rectilinear configuration, providing single-mode propagation of signals at said first predetermined wavelength and multi-mode propagation of energy at said second predetermined wavelength and said fiber being coupled at one end to said output of said dichroic coupler and being bent transversely to its length into a curved configuration for at least 70% of its length with a curvature radius such that said fiber in curved configuration provides substantially only single mode propagation therein at said second predetermined wavelength;

an input optical fiber interconnecting said source and the other of said inputs of said dichroic coupler;

a receiver for receiving said transmission signals as amplified by said amplifier; and means coupling the other end of said active fiber to said receiver.

13. An optical amplifier according to claim 12 wherein said curvature radius is in the range from 20 to 140 mm.

14. An optical amplifier according to claim 12 wherein said curvature radius is in the range from 35 to 100 mm.

15. An optical amplifier according to claim 12 wherein said first predetermined wavelength is in the range from about 1520 nm to about 1570 nm, said second predetermined wavelength is in the range from about 970 nm to about 990 nm and said fluorescent dopant is erbium.

16. An optical amplifier according to claim 12 wherein said active fiber comprises at least one portion in said curved configuration and at least another portion of lesser curvature, the sum of the lengths of the portion or portions of said curved configuration being at least equal to 70% of the length of said fiber.

17. An optical amplifier according to claim 16 wherein said another portion is at one end of said one portion.

18. An optical amplifier according to claim 16 wherein there are two of said another portion, and said one portion is continuous, one said another portion is at one end of the last-mentioned said one portion and the other said another portion is at the opposite end of the last-mentioned said one portion.

19. An optical amplifier according to claim 18 wherein the length of each said another portion is less than 400 mm.

20. An optical amplifier according to claim 18 wherein the length of each said another portion is less than 200 mm.

21. An optical amplifier according to claim 12 wherein said means coupling said other end of said active fiber to said receiver comprises an optical fiber which propagates said first predetermined wavelength coupled to said other end of said active fiber.

* * * * *

UNITED STATES PATENT AND TRADEMARK OFFICE
CERTIFICATE OF CORRECTION

PATENT NO. : 5,161,050

DATED : November 3, 1992

INVENTOR(S) : Grasso et al

It is certified that error appears in the above-identified patent and that said Letters Patent is hereby corrected as shown below:

Col. 4, line 39, $NA=(n^21-n\ ^2{}_2)^{\frac{1}{2}}$" should read $--NA=(n_1^2 - n_2^2)^{\frac{1}{2}}--$;

Col. 10, line 3, change "lengths" to --length--;

Col. 10, line 26, before "configuration" insert --active fiber comprises at least one portion in said curved--.

Signed and Sealed this

Fifth Day of October, 1993

BRUCE LEHMAN

Attest:

Attesting Officer

Commissioner of Patents and Trademarks